Oct. 13, 1964    T. E. BJORN ETAL    3,152,391
TOOL FOR WHEEL WEIGHTS
Filed Jan. 14, 1963
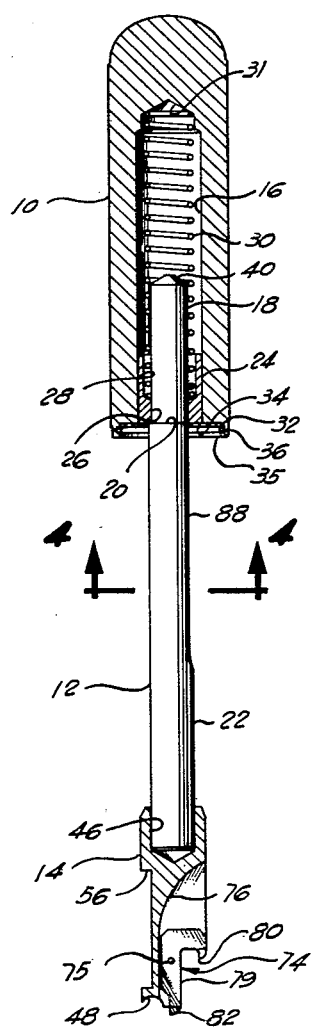
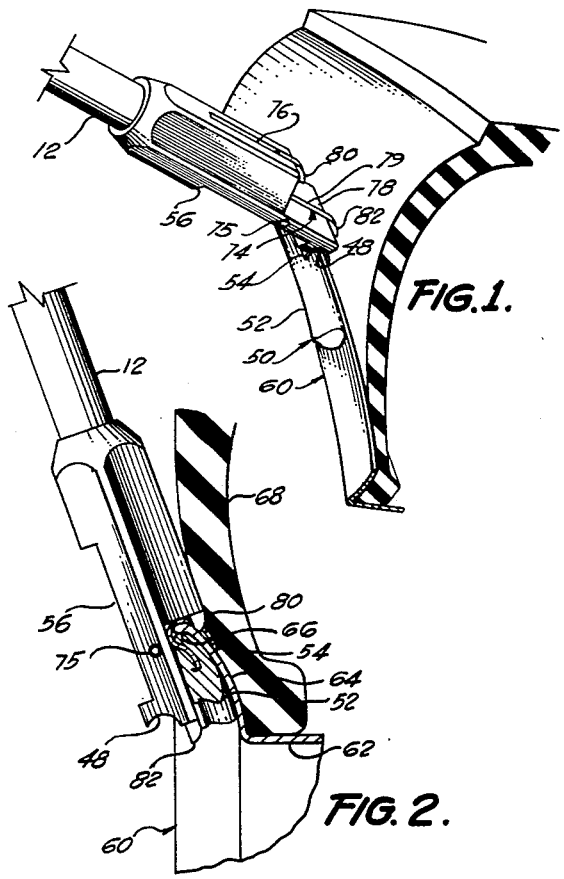
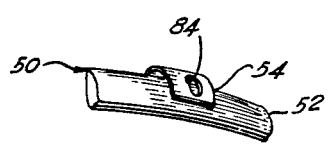
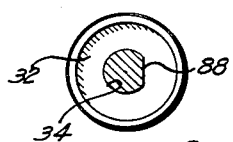
INVENTORS
Thomas E. Bjorn
Steven H. Hollander
By *A. G. Douvas*
Attorney United States Patent Office 3,152,391
Patented Oct. 13, 1964

3,152,391
TOOL FOR WHEEL WEIGHTS
Thomas E. Bjorn, Northbrook, and Steven H. Hollander, Chicago, Ill., assignors to Stewart-Warner Corporation, Chicago, Ill., a corporation of Virginia
Filed Jan. 14, 1963, Ser. No. 251,294
4 Claims. (Cl. 29—254)

This invention relates to a tool operable to secure a wheelweight to a rim of a wheel, and effective to remove the wheel weight when secured from the wheel rim.

It is generally well known that both static and dynamic unbalance of a rotating member, such as a wheel, can be corrected or counteracted by applying weights to various portions of the wheel. Thus, it is common in the automotive art to attach wheel weights to the wheel rim. A typical wheel weight consists of an elongated mass of heavy material, commonly a lead alloy, having convex outer contours adapted to complement the inside of the rim. A spring clip secured to the weighted mass defines therewith a U-shaped opening adapted to receive the wheel rim. To attach, the wheel weight is positioned with the receiving opening aligned with the rim and tapped slightly until the clip expands over the high point of the rim. Generally, this is a routine matter.

The task of attaching the wheel weight to the inner rim while the wheel is still on the vehicle, however, becomes somewhat complicated and tedious with conventional separate impact-type tools, such as the hammer and punch. The limited working space within the fender well and the various vehicle structures adjacent the wheel make safe, fast use of standard impact tools impractical if not impossible. In practice, it becomes quite difficult to position and hold both the weight and punch in one hand, and then provide a sufficient force with the hammer to drive the weight onto the rim. Injury is common, since the separate tools frequently glance off one another, or are missed entirely. Furthermore, the separate tools also require great operator time and effort to locate, reach and handle, as is so typified by the common situation of having the required missing tool of the set just out of reach.

Accordingly, an object of this invention is to provide a single tool operable to attach a wheel weight to, and/or to remove an attached wheel weight from, the rim of a vehicle wheel.

Another object of this invention is to provide an impact-type tool of unitary construction which can be fabricated economically, is both fast and safe in use, and is particularly useful in confined generally considered inaccessible locations.

These and other objects will be more readily appreciated after a review of the following specification, including as a part thereof the accompanying drawing, wherein:

FIG. 1 is a perspective view of a typical wheel rim and tire, partially broken away and in section, showing the subject tool as adapted to attach a wheel weight to the wheel;

FIG. 2 is a transverse section view of a typical wheel rim and tire, showing the subject tool as adapted to remove an attached wheel weight from the rim;

FIG. 3 is a longitudinal center sectional view of the subject tool;

FIG. 4 is a view as seen generally from line 4—4 of FIG. 3; and

FIG. 5 is a perspective view of a typical wheel weight illustrated in the above FIGS. 1 and 2 upon which the subject tool is adapted to be used.

The subject tool, best seen in FIG. 3, includes generally a handle or hammer element 10, a rod 12 connected to the handle, and a tool head 14 on the opposite end of the rod 12 from the handle 10. The handle 10 is of tough heavy material, such as steel, having a cylindrical outer surface, a hemispherical top surface, and having a generally uniform elongated bore 16 open only to the one end. The rod 12 fits freely within the bore 16, and has a uniform projection 18 necked down compared to the diameter 22 to define a shoulder 20 therebetween.

A bushing or piston member 24 having an inner bore 26 is press fit on the projection 18 against the shoulder 20. The bushing 24 has an enlarged annular recess 28 open away from the shoulder 20 adapted to receive therein one end of a helical coil spring 30. The coil spring 30 fits loosely over the projection 18 within the bore 16 and extends between the bushing 24 and the closed end 31 of the bore. The bushing 24 is adapted to slide freely within the bore 16.

A retainer or plate member 32 has an opening 34 therein large enough to receive the rod at cross-section 38 but too small for passage therethrough of the bushing 24. The retainer 32 is positioned against shoulder 34 on the handle 10 over the open end of the bore 16, and secured in place in any convenient manner, such as by snap ring 36 being received in the annular pocket adjacent the shoulder 35. The plate member 32 holds the rod 12 and bushing 24 thereon mechanically connected to the handle and limits movement thereof in the direction toward the open end of the bore.

The rod 12 and the bushing 24 thus can be reciprocated within the bore 16 relative to the handle 10. Such reciprocation is permitted to the limits between where the bushing 24 abuts the retainer plate 32 (as shown), and where the end 40 of the rod 12 abuts the end 31 of the bore 16. The coil spring 30 urges the rod 12 and the bushing 24 outwardly of the bore 16 so that normally the bushing 24 is restrained against the retainer plate 32 as shown.

The tool head 14 also is of tough material, such as steel, and has bore 46 to be press fit on the rod 12 remote of the handle 10. The end of head 14 remote of the bore 46 has a concave working surface 48 of similar curvature as the spring clip of the wheel weight. Thus as shown in FIGS. 1, 2 and 5 a typical wheel weight 50 includes an elongated mass 52 of heavy material, generally a lead alloy formed integrally with a spring clip 54. The tool head 14 further includes a shallow recess 56 extending from directly above the concave surface 48 generally to the bore 46. The recess 56 is adapted to receive the cooling disk (not shown) common to many types of wheel assemblies so as to permit free unrestricted operation of the tool. The length of the recess 56 thus corresponds generally to the spacing of the disk from the inner rim.

The rim and tire assembly is shown in FIGS. 1 and 2. The rim 60, of conventional construction, includes a felly portion 62 and a peripheral rim portion 64 slightly concave at its outer end at lip 66. The tire 68 is restrained on the wheel by abutment with the felly 62 and the rim 64. The wheel weight 50 (FIGS. 1, 2 and 5) is curved convex along its length with a generally large radius of curvature, and across its width so that it can complement the inner portion of the rim at lip 66. The spring clip 54 has its free projected end spaced from the mass 52 so as to form a generally U-shaped receiving opening therebetween.

To attach, the wheel weight 50 is positioned adjacent the rim 60 with the receiving opening aligned with the rim portion 64. By an inward force on the wheel weight in general alignment with the rim portion, the spring clip 54 is thereby forced over the lip 66 onto the rim. Since the spring clip must be sufficiently stiff or heavy to retain the wheel weight fixed under typical driving conditions, a substantial attaching force is required.

The subject tool greatly minimizes or eliminates the above-mentioned problems of attaching a wheel weight in a safe and convenient manner. The wheel weight positioned against the wheel rim is held in place by the operating surface 48, and is driven onto the rim by rapidly advancing the handle 10 toward the wheel weight until impact with the rod 12 against end 31 of the bore. By repeated impacts, if necessary, sufficient driving force can be generated to attach even the tight fitting wheel weights. Since the tool is unitary, it can be operated conveniently with only one hand, so that the other hand is free to position and hold the weight. Since there is no possibility of the handle or hammer member 10 missing or slipping off of the rod 12, the tool can be used fast with inherent safety. The tool also can be completely operated in extremely small confines because of this.

Of particular utility to the subject tool is the ejector means included therein for removing a secured wheel weight from the rim. A J-shaped ejector plate 74 (FIG. 3) is supported intermediate its ends by pivot pin 75 to head 14. The head is recessed longitudinally at 76 to receive the plate 74 freely and is further shaped transversely at 78 generally flush with the edge 79 of the secured plate. The ends 80 and 82 of the secured plate project slightly past the defined contours of the head and are used in various manners to remove the wheel weight from the rim.

As shown in FIG. 2 the tool is positioned so that the ejector pin 80 is received within opening 84 on the spring clip 54. A clockwise rotation of the tool fulcrums the tool against the side wall of the tire to apply a largely magnified force directly on the wheel weight in line with the rim to remove the wheel weight. In many situations where space is quite confined, the projection 82 instead can be inserted into the opening 84 and by twisting the tool about its longitudinal axis and rotating it transversly to the wheel rim to fulcrum thereon, a large disengaging force can be applied to the weight. To accommodate this twisting, the rod 12 is flattened at 88 and the opening 34 in retainer 32 is of like contour, so that the rod cannot be rotated relative to the handle 10. Easy removal of the wheel weight is important since commonly the first tried position of the wheel weight is improper so that the weight must be removed and repositioned.

While a specific embodiment of the invention has been disclosed it will be obvious to those skilled in the art that other modifications can be made. Accordingly it is desired that the invention be limited only by the scope of the claims hereinafter following.

What is claimed is:

1. A tool for securing a wheel weight having a spring clip to the peripheral portion of a wheel rim, comprising in combination, an elongated tool rod, a tool head on one end of the tool rod adapted to cooperate with the spring clip of the wheel weight and the wheel rim for securing the wheel weight to the wheel rim, said tool head having a working surface contoured concave to engage flush the intermediate portion of the spring clip to permit full impact type force to be applied against the clip without damaging it, and further having a shallow recess extending from a location adjacent the working surface but spaced therefrom toward the opposite end of the tool rod and aligned axially of the rod generally with the intermediate portion of the working surface operable thereby for receiving without interference any structure such as a cooling disc commonly disposed adjacent the wheel rim, an elongated tool handle, and means including spaced stops on the tool rod and tool handle mechanically connecting them to permit only limited movement relative to one another axially of the tool rod through the working surface so that with the working surface flush with the spring clip and the spring clip open to the wheel rim generally the rapid advance of the tool handle toward the working surface and the subsequent mechanical uniting with the tool rod is operable to drive the wheel weight onto the wheel rim.

2. A tool for securing a wheel weight having a spring clip to the peripheral portion of a wheel rim and/or for removing a secured wheel weight from the wheel rim, comprising in combination, an elongated tool rod, a tool head on one end of the tool rod adapted to cooperate with the spring clip of the wheel weight and the wheel rim for securing the wheel weight to the wheel rim, said tool head having a working surface contoured concave to engage flush the intermediate portion of the spring clip to permit full impact type force to be applied against the clip without damaging it, an elongated tool handle, means including spaced stops on the tool rod and tool handle mechanically connecting them to permit only limited movement relative to one another axially of the tool rod through the working surface so that with the working surface flush with the spring clip and the spring clip open to the wheel rim generally the rapid advance of the tool handle toward the working surface and the subsequent mechanical uniting with the tool rod is operable to drive the wheel weight onto the wheel rim, the tool head further having at least one ejector projection spaced from the working surface and projecting from the tool head proper a distance sufficient to fit within a receiving opening on the spring clip when the latter is secured to the wheel rim, and means to lock the tool handle torsionally to the tool rod operable thereby upon insertion of the ejector projection into the receiving opening on the spring clip and manipulation of the tool handle to fulcrum the tool head on the wheel for removing as desired the secured wheel weight from the wheel rim.

3. A tool for securing a wheel weight having a spring clip to the peripheral portion of a wheel rim and/or for removing a secured wheel weight from the wheel rim, comprising in combination, an elongated tool rod, a tool head on one end of the tool rod adapted to cooperate with the spring clip of the wheel weight and the wheel rim for securing the wheel weight to the wheel rim, said tool head having a working surface contoured concave to engage flush the intermediate portion of the spring clip to permit full impact type force to be applied against the clip without damaging it, the tool head further having a shallow recess extending from a location adjacent the working surface but spaced therefrom toward the opposite end of the tool rod and aligned axially of the rod generally with the intermediate portion of the working surface operable thereby for receiving without interference structure such as a cooling disc commonly disposed adjacent the wheel rim, an elongated tool handle, means including spaced stops on the tool rod and tool handle mechanically connecting them to permit only limited movement relative to one another axially of the tool rod through the working surface so that with the working surface flush with the spring clip and the spring clip open to the wheel rim generally the rapid advance of the tool handle toward the working surface and the subsequent mechanical uniting with the tool rod is operable to drive the wheel weight onto the wheel rim, the tool head further having at least one ejector projection spaced from the working surface and projecting from the tool head proper a distance sufficient to fit within a receiving opening on the spring clip when the latter is secured to the wheel rim, and means to lock the tool handle torsionally to the tool rod, operable thereby upon insertion of the ejector projection into the receiving opening on the spring clip and manipulation of the tool handle to fulcrum the tool head on the wheel for removing as desired the wheel weight from the wheel rim.

4. A tool for securing a wheel weight having a spring clip to the peripheral portion of a wheel rim and/or for removing a secured wheel weight from the wheel rim, comprising in combination, an elongated tool rod, a tool head on one end of the tool rod adapted to cooperate with the spring clip of the wheel weight and the wheel rim for securing the wheel weight to the wheel rim, said tool head having a working surface contoured concave to engage flush the intermediate portion of the spring clip to permit full impact type force to be applied against the clip without damaging it, and further having a shallow recess extending from a location adjacent the working surface but spaced therefrom toward the opposite end of the tool rod and aligned axially of the rod generally with the intermediate portion of the working surface operable thereby for receiving any structure such as a cooling disc commonly disposed adjacent the wheel rim, an elongated tool handle, means including spaced stops on the tool rod and tool handle mechanically connecting them to permit only limited relative movement relative to one another axially of the tool rod through the working surface so that with the working surface flush with the spring clip and the spring clip open to the wheel rim generally the rapid advance of the tool handle toward the working surface and the subsequent mechanical uniting with the tool rod is operable to drive the wheel weight onto the wheel rim, said connecting means in part including a piston secured on the tool rod and received in a bore in the tool handle for axial movement therein, a retainer plate secured to the tool handle outwardly of the piston for limiting separation of the piston from the tool rod in the direction away from the tool head, and a spring between the piston and tool handle to bias the piston against the retainer plate, the tool head further having at least one ejector projection spaced from the working surface and projecting from the tool head proper a distance sufficient to fit within a receiving opening on the spring clip when the latter is secured to the wheel rim, and means including the keyed cooperation of the tool rod and retainer plate to lock the tool handle torsionally to the tool rod operable thereby upon insertion of the ejector projection into the receiving opening on the spring clip and manipulation of the tool handle to fulcrum the tool head on the wheel for removing as desired the secured wheel weight from the wheel rim.

References Cited in the file of this patent

UNITED STATES PATENTS

| | | |
|---|---|---|
| 781,947 | Hartley et al. | Feb. 7, 1905 |
| 2,314,145 | Kalajian | Mar. 16, 1943 |
| 2,787,178 | Maxim | Apr. 2, 1957 |